United States Patent [19]
Champoux et al.

[11] 3,892,121
[45] July 1, 1975

[54] APPARATUS FOR COLD-WORKING HOLES

[75] Inventors: Louis A. Champoux, Seattle; Horace E. Hill, Renton; Joseph L. Phillips, Bellevue, all of Wash.

[73] Assignee: The Boeing Company, Seattle, Wash.

[22] Filed: Sept. 12, 1973

[21] Appl. No.: 396,637

[52] U.S. Cl. .............................. 72/393; 29/243.52
[51] Int. Cl. ............................................ B21d 41/02
[58] Field of Search ............ 72/393, 370, 367, 391; 29/235, 237, 255, 263, 280, 282, 243.52, 446; 269/48.1

[56] References Cited
UNITED STATES PATENTS

| | | | |
|---|---|---|---|
| 1,610,796 | 12/1926 | King | 72/393 |
| 2,155,542 | 4/1939 | Graham | 72/393 |
| 2,275,451 | 3/1942 | Maxwell | 72/370 |
| 2,430,554 | 11/1947 | Bugg et al. | 72/393 |
| 3,052,973 | 9/1962 | Williams | 29/282 |
| 3,067,502 | 12/1962 | Wheatley et al. | 29/282 |
| 3,358,492 | 12/1967 | Richter | 72/393 |
| 3,566,662 | 3/1971 | Champoux | 29/446 |
| 3,805,578 | 4/1974 | King | 72/370 |

*Primary Examiner*—C. W. Lanham
*Assistant Examiner*—James R. Duzan
*Attorney, Agent, or Firm*—Morris A. Case; Glenn Orlob

[57] ABSTRACT

A segmented sleeve restrained at one end is constrained to be kept in contact with a mandrel which the sleeve encircles. The mandrel is slideably mounted inside the sleeve and has an enlarged diameter which radially expands the sleeve as the enlarged portion passes by.

5 Claims, 9 Drawing Figures

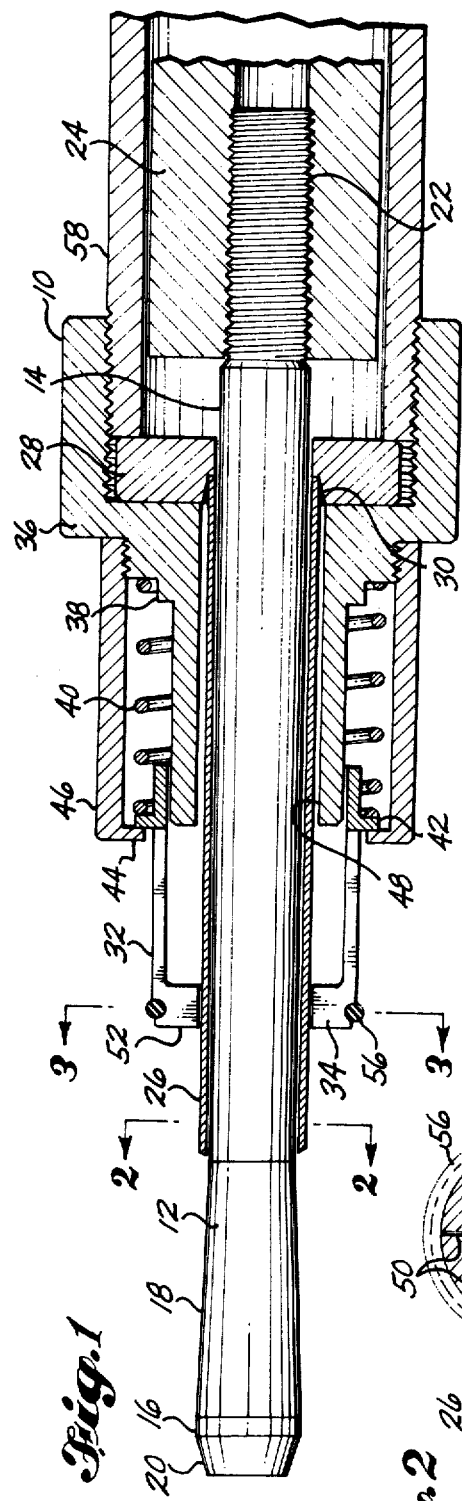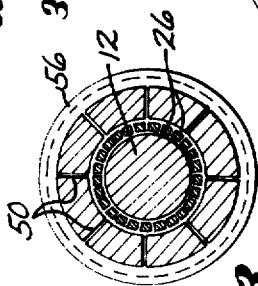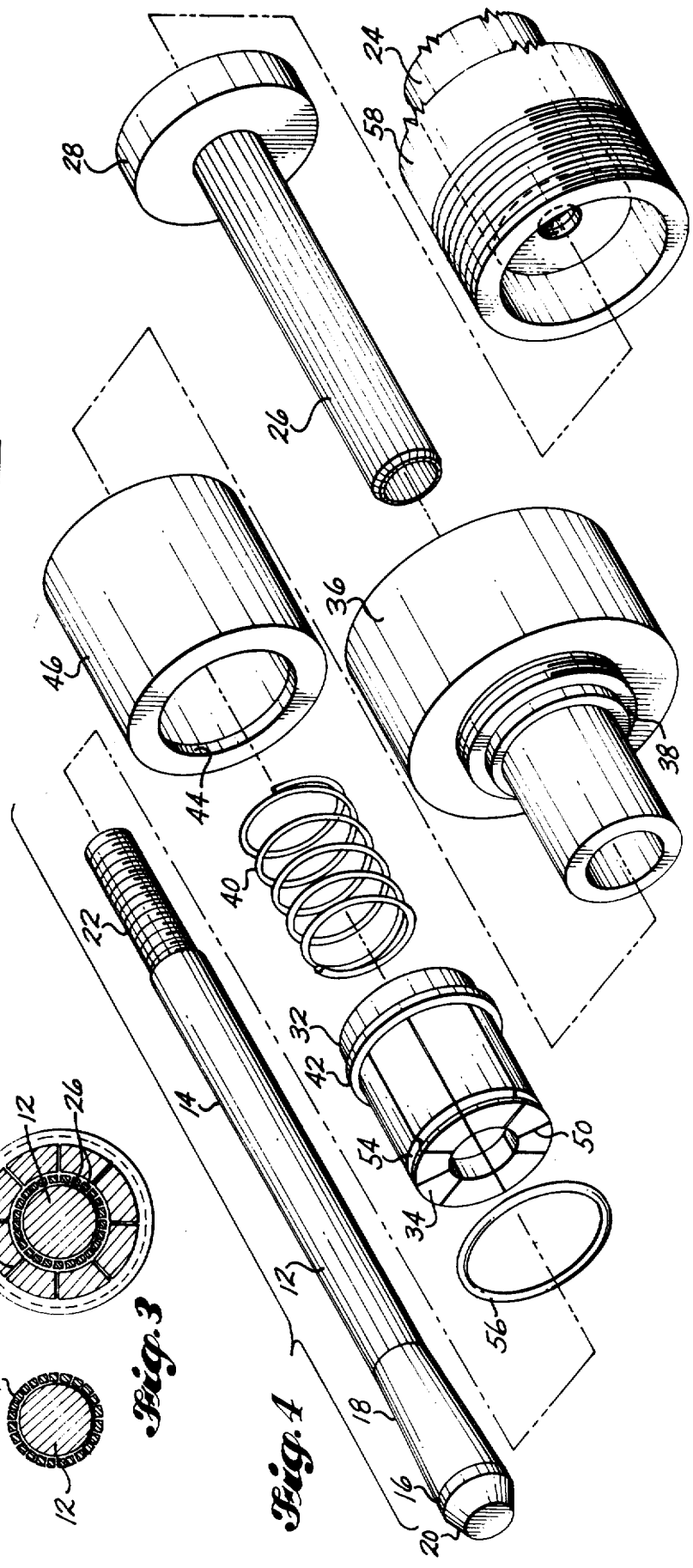

3,892,121

APPARATUS FOR COLD-WORKING HOLES

BACKGROUND OF THE INVENTION

A drilled hole for the insertion of a fastener creates an area of high localized stresses which is a potential source of cracks then failure in a structural member which is subjected to flexing and bending. This localized stress condition may be relieved by cold-working the hole. During cold-working the workpiece is stressed beyond the yield strength of the material to counteract the localized stresses and appreciably improve the fatigue life of the material.

It is known to pull an enlarged mandrel through a hole to effect cold-working. This has the disadvantage of requiring the mandrel to be inserted from one side and drawn through the other and does not permit cold-working blind holes.

In U.S. Pat. No. 3,566,662 by Champoux, there is disclosed a method of cold-working of a hole using a thin-walled split sleeve which is placed over a mandrel and may be inserted into a blind hole. Upon retraction of the mandrel the sleeve is deformed and expanded against the hole to effect the cold-working. This method is extremely effective, however, it has the penalty of a disposable one-time use sleeve which is expensive when large numbers of holes are being cold-worked.

It was discovered that an apparatus having a reusable segmented sleeve could be used for blind hole cold-working.

SUMMARY OF THE INVENTION

In this invention the sleeve is segmented and has a plurality of longitudinally extending strips or fingers. These strips are of a fully hardened spring steel such as 1095 and has the strength to withstand distortion without yielding. The sleeve is restrained around the periphery at one end and is shaped to accept a slideably mounted mandrel from the other end. The mandrel and unrestrained end of the sleeve are inserted in a hole in a workpiece and an enlarged diameter of the mandrel extending outside the sleeve is pulled into the sleeve to radially expand the sleeve and cold-work the hole. The sleeve is constrained to maintain contact with the mandrel while allowing for its expansion.

DESCRIPTION OF THE DRAWINGS

FIG. 1 shows a side elevation sectional view of the invention.

FIG. 2 is a sectional view taken along line 2—2 of FIG. 1.

FIG. 3 is a sectional view taken along line 3—3 of FIG. 1.

FIG. 4 is an exploded perspective view of the invention as shown in FIG. 1.

DETAILED DESCRIPTION

Figure 5:
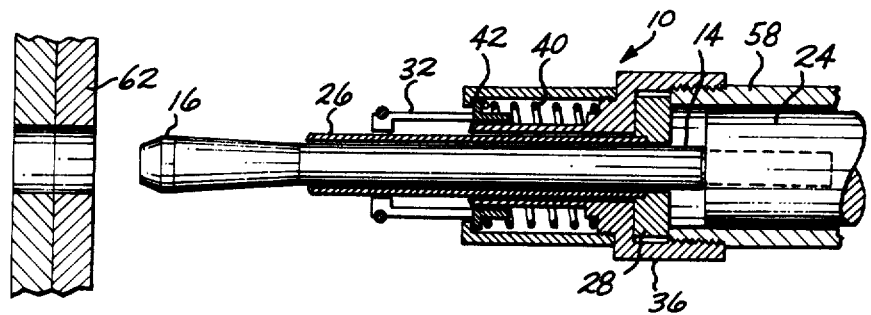
FIG. 5 is a view of the invention as in FIG. 1 prior to inserting the apparatus into a hole in a workpiece.
Figure 6:
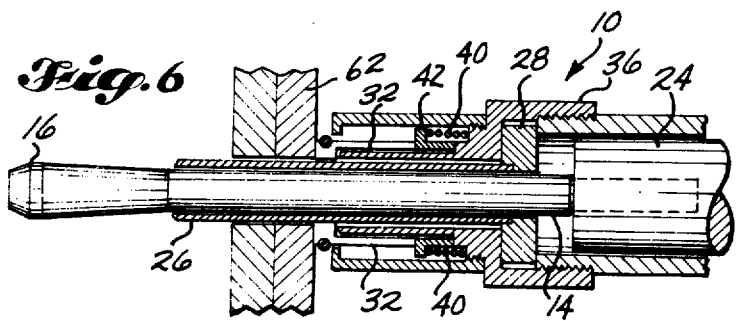
FIG. 6 shows the apparatus inserted into the hole in a workpiece prior to cold-working the hole.

In one preferred embodiment a cold-working device 10 has a mandrel 12 which has a uniform diameter 14 throughout much of its length. The mandrel also has an enlarged diameter at 16 with a gradually tapered length 18 extending between the uniform diameter and the enlarged diameter and a more rapidly tapered length 20 extending from the enlarged diameter to one end of the mandrel. The other end of the mandrel is threaded at 22 for engagement in a coupling 24. The coupling is connected to a source of power not shown for imparting reciprocating movement to the mandrel.

A sleeve 26, shaped to fit around the uniform diameter section 14 of the mandrel 12 is made up of a plurality of longitudinally extending strips. These strips, preferably of a square fully hardened spring steel material, are fastened around the periphery at one end to ring 28. In this embodiment the strips are individually welded 30 to the ring. This provides positioning and restraint to one end of the sleeve. A larger sleeve 32 with projection 34 extending radially inward provides a peripheral constraining contact with sleeve 26. This contact may be at various places along the length of sleeve 26 as the larger sleeve is slideably mounted over an annular support section 36. This support section has seat 38, for one end of a spring 40 the other end of which rests against projection 42 on the large sleeve 32. This large sleeve is therefore free to move reciprocally against the action of the spring and has its outward travel limited by contact of its outward projection 42 with an inwardly extending projection 44 of cap 46.

The inside diameter 48 of annular support section 36 is large enough to permit radially extending movement of sleeve 26. The larger sleeve 32 is split at 50 part way through at several places around its periphery with the slits extending from the end 52 to the projection 42 to allow for radially extending movement. Circular slot 54 holds flexible 0-ring 56 which acts to resiliently compress the extended movement. The ring 28 is held in alignment between annular support section 36 and cylindrical structure 58.

In operation the enlarged diameter 16 of the mandrel 12 extends outside the unrestrained end of sleeve 26. The mandrel and the sleeve are sized to permit entry through hole 60 in workpiece 62 to allow cold-working through blind holes.

Figure 7:
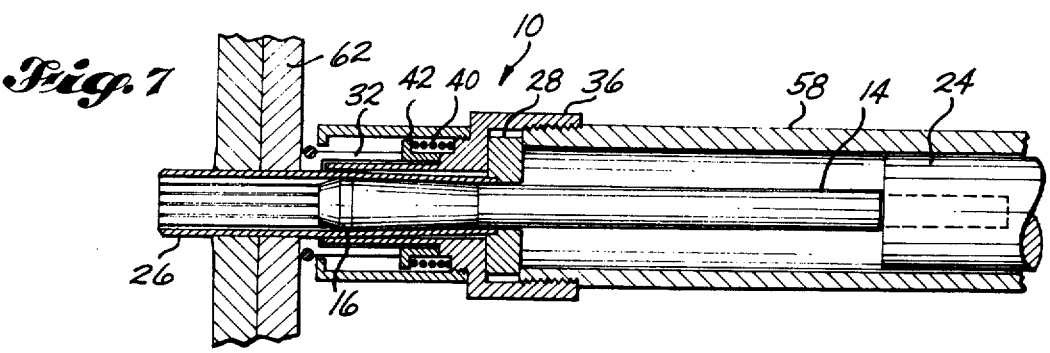
FIG. 7 shows the apparatus inserted into the hole in the workpiece after cold-working the hole.

Before entry, as shown in FIG. 5, the constraining large sleeve 32 is extended by the spring 40 to keep the sleeve in close contact with the mandrel and premits ease of entry of the sleeve into the work hole. It is preferable to coat both the inside and outside surfaces of the sleeve and mandrel with a dry lubricant prior to use to lower the frictional resistance between moving parts. This may be any firm forming dry lubricant that can withstand the pressures such as lead oxide, graphite or molybdenum disulfide. Once the device is inserted into the hole of the workpiece the mandrel is pulled into the inside of the sleeve so that the enlarged part of the mandrel radially expands the sleeve to exert force against and to cold-work the hole. Once the mandrel has passed through the hole, as is shown in FIG. 7, the complete device is moved to remove the sleeve from the hole. The segmented sleeve will leave multiple marks in the hole in the workpiece, but the material around the hole has been yielded, therefore, the hole may be reamed to remove the marks to complete the finished hole without effecting the structural characteristics of the material in the cold-worked hole.

Figure 9:
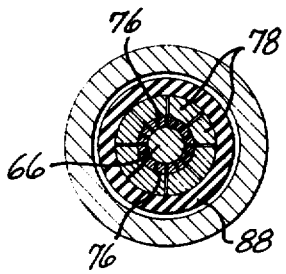
FIG. 9 shows a sectional view taken along lines 9—9 of FIG. 8.
Figure 8:
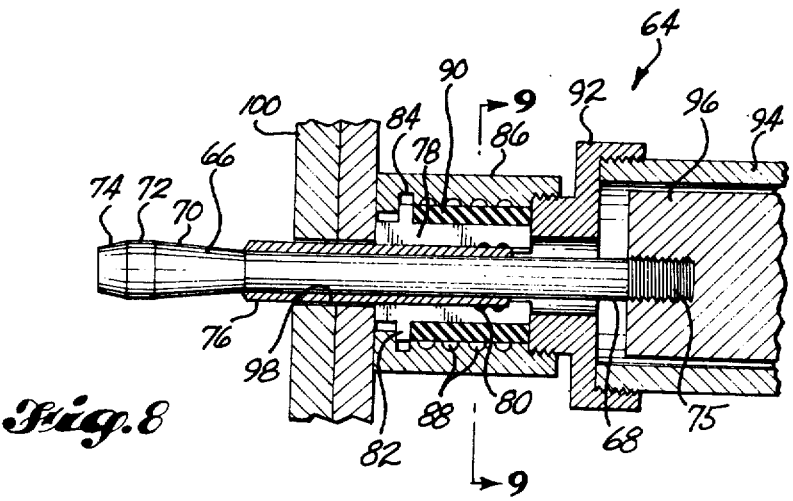
FIG. 8 shows a side elevation of a sectional view of an alternate embodiment of the invention, with the apparatus inserted into a hole in the workpiece prior to cold-working of the hole.

In yet another preferred embodiment as best shown in FIGS. 8 and 9, a cold-working device 64 has a mandrel 66 which has a uniform diameter 68 throughout much of its length, a tapered section 70, an enlarged diameter section 72, a second but shorter tapered section 74, and a threaded end 76. A segmented sleeve 76 made up of a plurality of longitudinally extending strips of spring steel encircle the uniform diameter part of the mandrel. The strips making up the sleeve are held in alignment by a quill 78 which is made up of a plurality of longitudinally split sections. The sleeve is fastened around its periphery and near one end of its length to the quill. In this embodiment the two are welded or brazed together at 80. Each segment of the quill has outwardly extending projection 82 which registers with annular recess 84 in retainer cap 86. This cap has a series of semi-circular annular recesses 88. A resilient annular sleeve 90 is confined between the quill and the cap. The cap is fastened to a structural member 92 which is in turn connected to a cylindrical member 94. The mandrel is threaded into coupling 96 which is connected to a source of power not shown which exerts reciprocating movement to the mandrel. The mandrel and the sleeve are coated with a dry lubricant.

In operation the mandrel 66 and sleeve 76 are inserted into hole 98 of workpiece 100. The mandrel is then pulled in to force the enlarged portion 70 of the mandrel into the sleeve and past the hole to impart radially expanding force from the sleeve into the hole to cold-work same. At this time the sections of the quill 78 are forced radially outward but are constrained by the confined resilient annular sleeve 90. The semicircular annular recesses allow expansion of the resilient sleeve. The cold-working device is then removed and the hole reamed to fit.

We claim:

1. An apparatus for cold-working holes comprising:
   a. a sleeve of a plurality of lengthwise strips restrained around the periphery at one end, wherein the restraint to the sleeve comprises a longitudinally split sectionalized quill to which the sleeve is fastened,
   b. a mandrel tapering to an enlarged diameter and thence to a reduced diameter slideably mounted inside the sleeve to act in combination inside a hole in a workpiece to radially expand the sleeve and cold-work the hole as the enlarged diameter of the mandrel passes through the hole, and
   c. means for constraining the sleeve wherein said means comprises a ring encircling the quill and an elastic annular section between the ring and the quill.

2. An apparatus for cold-working holes comprising:
   a. a sleeve of a plurality of lengthwise strips restrained around the periphery at one end wherein the restraint to the sleeve comprises a ring to which the sleeve is fastened,
   b. a mandrel tapering to an enlarged diameter and thence to a reduced diameter slideably mounted inside the sleeve to act in combination inside a hole in a workpiece to radially expand the sleeve and cold-work the hole as the enlarged diameter of the mandrel passes through the hole, and
   c. means for constraining the sleeve.

3. An apparatus for cold-working holes as in claim 2 wherein the means for constraining the sleeve comprises a larger sleeve reciprocatingly mounted to contact the first sleeve, and means thereon for allowing expansion while maintaining contact between the two sleeves.

4. An apparatus for cold-working holes in a workpiece comprising:
   a. a ring,
   b. a sleeve of a plurality of lengthwise strips fastened around the periphery of one end to the ring,
   c. a mandrel slidably mounted inside the sleeve with a taper to an enlarged diameter thence to a reduced diameter extending outside the unrestrained end of the sleeve prior to cold-working, the mandrel and sleeve combine to radially extend the sleeve to the cold-work the hole as the enlarged diameter of the mandrel passes through the hole,
   d. means for constraining the sleeve wherein the means for constraining the sleeve comprises:
   e. an annular support member extending inward from the ring encircling the sleeve and sized to prevent contact with the sleeve, and
   f. a second sleeve slideably mounted to and encircling the support member with a radially inward extending projection making resilient contact with the first sleeve.

5. An apparatus for cold-working holes comprising: a sleeve of a plurality of lengthwise strips fastened around the periphery at one end to a ring; a mandrel slideably mounted inside the sleeve with a taper to an enlarged diameter thence to a reduced diameter extending outside the unrestrained end of the sleeve prior to cold-working; an annular support member extending inward from the ring, encircling the sleeve and sized to prevent contact with the sleeve; a second sleeve slideably mounted to and encircling the support member with a radially inward extending projection to resiliently keep the first sleeve in contact with the mandrel; and said mandrel enlarged diameter sized to be pulled inside the sleeve through the hole to radially expand the sleeve and cold-work the hole.

* * * * *